(12) United States Patent
Carlson et al.

(10) Patent No.: US 9,856,408 B2
(45) Date of Patent: Jan. 2, 2018

(54) ICE-PHOBIC SUBSTRATES AND COATINGS AND METHODS FOR THEIR PREPARATION AND USE

(71) Applicant: EMPIRE TECHNOLOGY DEVELOPMENT LLC, Wilmington, DE (US)

(72) Inventors: William Brenden Carlson, Seattle, WA (US); Gregory D. Phelan, Cortland, NY (US); Philip A. Sullivan, Bozeman, MT (US); Feng Wan, Issaquah, WA (US); Timothy Martin Londergan, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 28 days.

(21) Appl. No.: 14/763,739

(22) PCT Filed: Jan. 25, 2013

(86) PCT No.: PCT/US2013/023060
§ 371 (c)(1),
(2) Date: Jul. 27, 2015

(87) PCT Pub. No.: WO2014/116221
PCT Pub. Date: Jul. 31, 2014

(65) Prior Publication Data
US 2015/0329756 A1    Nov. 19, 2015

(51) Int. Cl.
B32B 9/02      (2006.01)
C09K 3/18      (2006.01)
A63C 5/056     (2006.01)

(52) U.S. Cl.
CPC ............. *C09K 3/18* (2013.01); *A63C 5/056* (2013.01); *Y10T 428/31801* (2015.04)

(58) Field of Classification Search
CPC ................. C09K 3/18; A63C 5/056
See application file for complete search history.

(56) References Cited

U.S. PATENT DOCUMENTS

| 5,461,100 A | 10/1995 | Jenkins et al. |
| 6,702,953 B2 | 3/2004 | Simenoinger, III et al. |
| (Continued) | | |

OTHER PUBLICATIONS

Bruno et al. (Macromolecules, vol. 43, No. 24, 2010).*

(Continued)

*Primary Examiner* — Shane Fang
(74) *Attorney, Agent, or Firm* — Pepper Hamilton LLP (57) ABSTRACT

Ice phobic coatings and substrates and methods of making and using them are described. Some embodiments provide for an ice-phobic coating including a hydrophobic entity bonded to a hydrophilic moiety, wherein the hydrophilic moiety is capable of lowering a freezing point of water. Some embodiments provide for an ice-phobic article including a substrate having the ice-phobic coating applied on the substrate. In some embodiments, a method of making an ice-phobic coating may include bonding the hydrophobic entity with the hydrophilic moiety. In some embodiments, a method of making an ice-phobic article includes applying the ice-phobic coating to a substrate. Some embodiments also provide for a kit for making an ice-phobic article. Such ice-phobic coatings may be used to coat or impregnate winter equipment, cloth, shoes, sporting equipment, road signs, traffic lights, sidewalks, aircrafts, vehicles, or the like.

24 Claims, 4 Drawing Sheets

(56) References Cited

U.S. PATENT DOCUMENTS

2005/0241756 A1 11/2005 Harthcock et al.
2008/0175987 A1 7/2008 Carter
2011/0159299 A1 6/2011 Linforf et al.

OTHER PUBLICATIONS

International Search Report for International Application No. PCT/US2013/023060 dated Apr. 1, 2013.
Zhang et al., Graft Copolymers from Poly(vinylidene fluoride-co-chlorotrifluoroethylene) via Atom Transfer Radical Polymerization, *Macromolecules* (Apr. 8, 2006), 39(10):3531-3539.

\* cited by examiner

FIGURE 4

ICE-PHOBIC SUBSTRATES AND COATINGS AND METHODS FOR THEIR PREPARATION AND USE

CLAIM OF PRIORITY

This application is a U.S. National Stage filing under 35 U.S.C. §371 of International Application No. PCT/US2013/023060 filed on Jan. 25, 2013 entitled "ICE-PHOBIC SUBSTRATES AND COATINGS AND METHODS FOR THEIR PREPARATION AND USE," which is incorporated herein by reference in its entirety.

BACKGROUND

Winter sports such as skiing, snowboarding, and sleighing involve sliding over a surface of ice. Sliding occurs when a thin film of water forms in the interface between the object and ice which lubricates the interface. In winter sports where speed is important, lowering the friction between the sports equipment and the surface of the ice is highly desirable.

In addition to reducing friction for winter sport equipment, prevention of ice formation may be useful for preventing ice formation on other surfaces, such as, for example, airplanes and road signs.

However, virtually all surfaces exhibit significant molecular level roughness. The rough molecular surfaces allow ice to adhere mechanically, even to highly non-wetting surfaces. The collision of a supercooled water droplet with a surface may involve enough energy to overcome most unfavorable Gibbs free energy changes of wetting and therefore cause ice formation on the surface. There is a need in the art for a material that prevents water from freezing at its surface.

SUMMARY

Some embodiments described in this document relate to ice phobic coatings and substrates and methods of making and using them. Some embodiments are directed to an ice-phobic coating including a hydrophobic entity bonded to a hydrophilic moiety. The hydrophilic moiety of embodiments disclosed in this document may be capable of lowering a freezing point of water.

Some embodiments are directed to an ice-phobic article including a substrate having an ice-phobic coating on at least one surface to form a coated surface, in which the coating includes a hydrophobic entity bonded to a hydrophilic moiety; and in which the hydrophilic moiety is capable of lowering a freezing point of water.

In some embodiments, a method of making an ice-phobic coating includes bonding a hydrophobic entity with a hydrophilic moiety, in which the hydrophilic moiety is capable of lowering a freezing point of water. In some embodiments, a method of making an ice-phobic article includes applying an ice-phobic coating to at least one surface of a substrate to form a coated surface, in which the ice-phobic coating includes a hydrophobic entity bonded to a hydrophilic moiety, and in which the hydrophilic moiety is capable of lowering a freezing point of water.

Some embodiments described in this document are directed to a kit for making an ice-phobic article which includes an ice phobic coating having a hydrophobic entity bonded to a hydrophilic moiety, in which the hydrophilic moiety is capable of lowering a freezing temperature of water, and instructions for applying the ice-phobic coating onto a substrate to form the ice-phobic article.

Some embodiments relate to ice-phobic coatings that can be used to coat the surface of skis, snowboards, sleighs, sleds, skates, and many other winter sports equipment. In some embodiments, the ice-phobic coatings may be used to coat or impregnate cloth, shoes, sporting equipment, rubber, plastic, road signs, traffic lights, sidewalks, aircrafts, vehicles, or snow removal equipment.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part of this document. In the drawings, similar symbols typically identify similar components, unless the context dictates otherwise. The illustrative embodiments described in the detailed description, drawings, and claims are not meant to be limiting. Other embodiments may be used, and other changes may be made, without departing from the spirit or scope of the subject matter presented in this document. It will be readily understood that the aspects of the present disclosure, as generally described in this document, and illustrated in the Figures, can be arranged, substituted, combined, separated, and designed in a wide variety of different configurations, all of which are explicitly contemplated to be within the scope of this disclosure.

Figure 1:
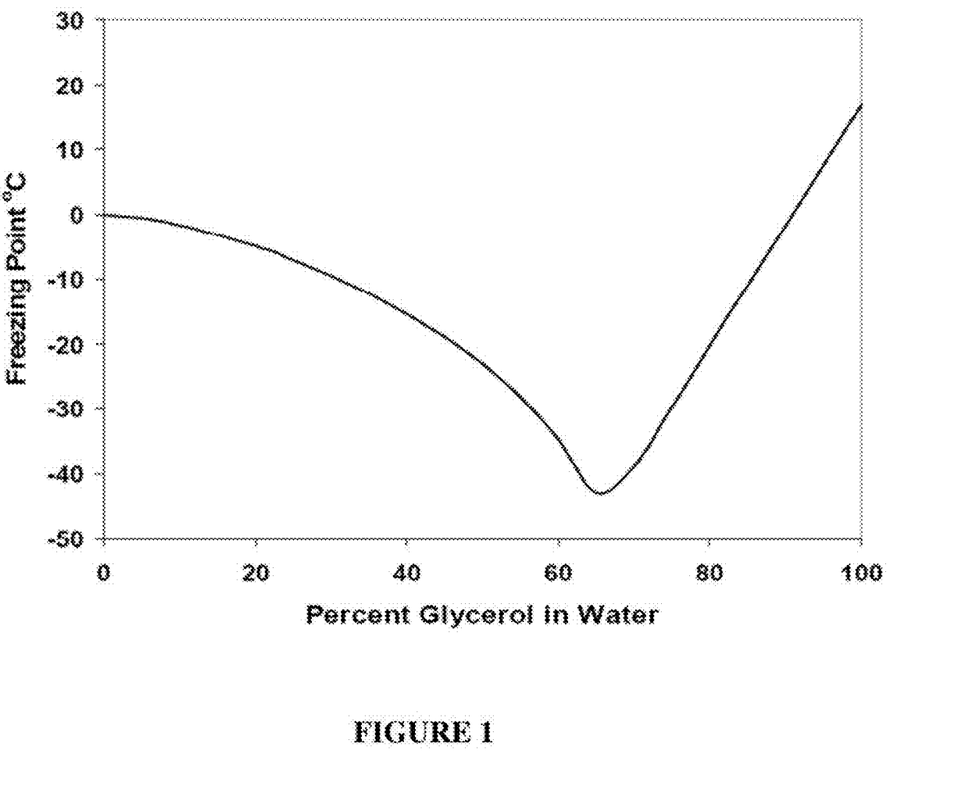
FIG. 1 illustrates the freezing point depression of water in a glycerol/water solution.

The principles of water activity and freezing point depression are applicable in the design and synthesis of a material that prevents water from freezing at its surface using the concept of freezing point depression by hydration. The activity of water governs both boiling and freezing points and is given by $a_w = P/P_0$ where P is the vapor pressure of water in solution and $P_0$ is the vapor pressure of pure water at the same temperature. The activity of pure water is defined as 1. Water/sugar solutions can display activity values as low as 0.5. $a_w$ is related to freezing point by $$\ln a = \int_{T_{fus}^*}^{T_{fus}} \frac{\Delta_{fus} \overline{H}}{RT^2} dT,$$

where a is the activity, $\Delta_{fus}H$ is the heat of fusion (enthalpy of freezing), R is the gas constant and T is the temperature. The freezing point depression may be derived from the activity of water expression to give $\Delta T_{fus} = K_f m$ where $K_f$ is the freezing point depression constant and m is the molality. For example, both water and glycerol have relatively high freezing points of 0° C. and 17° C. respectively. Glycerol strongly interacts with water and changes the activity of water greatly; hence, the freezing point of water/glycerol solutions may be depressed to lower than −45° C. (FIG. 1). In contrast, the freezing point of water in a salt water slurry is −18° C., which defines 0 on the Fahrenheit scale. Hydrophobic materials may lower the freezing point of water. In fact, due to the molecular scale roughness of these surfaces, nucleation effects can actually lead to water freezing at higher temperatures on hydrophobic surfaces. When a hydrophobic material that is cooled to 0° C. or below collides with supercooled liquid water, the water may freeze instantly due to such nucleation effects. The hydrophobic nature of the coating may actually act to enhance ice build-up in this particular scenario and may, therefore, slow down a skier, snowboarder, or other participant.

If a surface is chemically modified to include hydrophilic moieties at a high enough density, the supercooled water may be prevented from freezing at the interface. The activity of water at the interface between water and the hydrophilic surface may be modified by interactions between water and hydrophilic moieties. At the interface of a water/hydrophilic surface, a phenomenon called "the osmotic depression of freezing point" occurs creating a very thin layer of what has been termed "unfreezable" water. The distance between the water and the hydrophilic group may determine the lowering of the freezing temperature.

Embodiments describe the creation of a hydrophilic surface described above by grafting chains of hydroxyl, or polar group-bearing moieties (such as, for example, sorbitol or poly-vinyl alcohol) onto hydrophobic entities, such as fluorinated chains or monomers, to form an ice-phobic coating. In some embodiments, the ice-phobic coating may include a polymer network. In some embodiments, the ice-phobic coating may include a hydrophobic polymer attached to a hydrophilic moiety. In some embodiments, the polymer network may include an acrylate/epoxy polymer network. In some embodiments, the ice-phobic coating includes a wax.

In order for the activity of water to change, lowering the freezing point, the material must exhibit strong interactions (solubility) with water and be present in sufficient number density. In some embodiments, the ice-phobic coating includes a high concentration of hydrophilic groups. In some embodiments, the molar ratio of hydrophilic groups to hydrophobic groups in the coating is 2:1, 1.5:1, 1:1, 0.5:1, 0.75:1, 0.25:1, or a range between any two of these values. One advantage of having a high concentration of hydrophilic groups in the ice-phobic coating is that it is energetically favorable and enables the hydrophilic moieties to interact with water at the hydrophilic moiety/water interface because the hydrophilic moieties will self-segregate from the otherwise hydrophobic entities which make up the bulk of the coating. In embodiments described in this document, the terms "entity", "moiety", and "group" may be used interchangeably when referring to hydrophobic or hydrophilic portions of the coating.

The structure of the hydrophilic moiety is important for freezing point depression of water. In some embodiments, the hydrophilic moiety interacts strongly enough with water to prevent water from interacting with itself. For example, polyethers may not affect freezing point because it has weak hydrogen bonding with water, whereas simple alcohols, salts, ethylene glycol and glycerol have stronger hydrogen bonding with water, with glycerol having the strongest hydrogen bonding, and therefore can affect freezing point depression.

The amount of unfrozen water which may be present near a surface of the coated article at a given freezing temperature depends on the geometry of the coated surface and how strongly the hydrophilic moieties attract water. Estimates of the amount of unfrozen water may be made using the experimentally determined hydration law for the hydration energy per unit volume. In some embodiments, the unfrozen water to area of contact can be related by $$\frac{n}{A} \cong \frac{\lambda}{2v_w} \ln \frac{P}{P_0},$$

where A is area, n is the number of unfrozen water molecules at the hydrophilic surface, $\lambda$, is a term to describe the membrane geometry, and the term $$\frac{P}{P_0}$$

is the activity of water at the hydrated surface. The term $$\frac{P}{P_0}$$

may be related to temperature using the equation:

$$\frac{n}{A} \cong \frac{\lambda}{2v_w} \ln \frac{L_{iw} \Delta T}{P_0 v_w T_c},$$

where $v_w$ is the molecular or molar specific volume of water, $T_c$ is the equilibrium freezing temperature, and $L_{iw}$ is the latent heat.

Some embodiments described in this document relate to ice phobic coatings and substrates and methods of making and using them. Some embodiments are directed to an ice-phobic coating including a hydrophobic entity bonded to a hydrophilic moiety. The hydrophilic moiety of embodiments disclosed in this document may be capable of lowering a freezing point of water. In some embodiments, the ice-phobic coating may include an amphiphilic molecular structure, in which the coating is polar and hydrophilic at one end and non-polar and hydrophobic at the other end. In some embodiments, the ice-phobic coating may coat an article such that the hydrophilic moiety of the coating faces away from the surface of the article being coated and interacts with water, whereas the hydrophobic entity of the coating avoids the water and binds to the surface of the coated article.

Some embodiments described in this document provide for an ice-phobic coating including a hydrophobic entity bonded to a hydrophilic moiety. Some embodiments are directed to an ice-phobic article including a substrate having an ice-phobic coating on at least one surface to form a coated surface, in which the coating includes a hydrophobic entity bonded to a hydrophilic moiety. Some embodiments are directed to a method of making an ice-phobic coating including bonding a hydrophobic entity with a hydrophilic moiety, in which the hydrophilic moiety is capable of lowering a freezing point of water. Some embodiments are directed to a method of making an ice-phobic article including applying an ice-phobic coating to at least one surface of a substrate to form a coated surface, in which the ice-phobic coating includes a hydrophobic entity bonded to a hydrophilic moiety. In some embodiments, applying includes coating onto or the at least one surface of the substrate with the coating.

In some embodiments, the hydrophilic moiety is capable of lowering a freezing point of water. In some embodiments, the hydrophilic moiety is capable of lowering a freezing point of aqueous solutions. In some embodiments, water interacting with the hydrophilic moiety has a freezing point of less than about 0° C. In some embodiments, water interacting with the hydrophilic moiety has a freezing point of about 0° C. to about −40° C. In some embodiments, water interacting with the hydrophilic moiety has a freezing point of about −5° C. to about −40° C., about −10° C. to about −40° C., about −15° C. to about −40° C., about −20° C. to about −40° C., about −25° C. to about −40° C., about −30° C. to about −40° C., about −35° C. to about −40° C., about 0° C. to about −35° C., about 0° C. to about −30° C., about 0° C. to about −25° C., about 0° C. to about −20° C., about 0° C. to about −15° C., about 0° C. to about −10° C., about 0° C. to about −5° C., about −40° C., about −35° C., about −30° C., about −25° C., about −20° C., about −15° C., about −10° C., about −5° C., about −13° C., about −18° C., about −22° C., about −38° C., or a range between any two of these values (including endpoints).

In some embodiments, the hydrophobic entity includes about 20 to about 50 carbon atoms. In some embodiments, the hydrophobic entity includes about 20 to about 40, about 20 to about 35, about 20 to about 30, about 20 to about 25, about 25 to about 40, about 30 to about 40, about 35 to about 40 carbon atoms or a range between any two of these values (including endpoints). The hydrophobic entity may include a hydrocarbon, a fluorocarbon, a silane, a siloxane, a silicone, a fatty acid or a combination thereof. The hydrophobic entity may include a straight chain, branched, aromatic, or cyclic. In some embodiments, the hydrophobic entity includes a crosslinked polymer network. In some embodiments, the hydrophobic entity may include poly(vinylidene fluoride), poly(vinyl fluoride), poly(chlorotrifluoroethylene), poly(tetrafluoroethylene), or poly(trifluoroethylene). In some embodiments, the hydrophobic entity includes or is derived from a fatty acid. Examples of fatty acids include Propionic acid, Butyric acid, Valeric acid, Caproic acid, Enanthic acid, Caprylic acid, Pelargonic acid, Capric acid, Undecylic acid, Lauric acid, Tridecylic acid, Myristic acid, Pentadecylic acid, Palmitic acid, Margaric acid, Stearic acid, Nonadecylic acid, Arachidic acid, Heneicosylic acid, Behenic acid, Tricosylic acid, Lignoceric acid, Pentacosylic acid, Cerotic acid, Heptacosylic acid, Montanic acid, Nonacosylic acid, Melissic acid, Henatriacontylic acid, Lacceroic acid, Psyllic acid, Geddic acid, Ceroplastic acid, Hexatriacontylic acid or the like.

In some embodiments, the hydrophilic moiety includes hydroxyl groups, amides, polyamines, polyamides, polar groups, salts, polyols, amines, or a combination thereof. In some embodiments, the hydrophilic moiety includes glycerol, sorbitol, mannitol, propylene glycol, sucrose, magnesium sulfate, lithium chloride, calcium fluoride, urea, xylitol, pentaerythritol, erythritol, butanediol, diethylene glycol, dipropylene glycol, sodium acetate, potassium formate, magnesium acetate, magnesium lactate, calcium pyruvate, ethylene carbonate, trimethylolpropane, calcium propionate, disodium succinate, tripotassium citrate, calcium acetate, potassium acetate, sodium formate, ethylene glycol, sodium chloride, potassium chloride, strontium chloride, magnesium chloride, poly-vinyl alcohol, or a combination thereof. In some embodiments, the hydrophilic moiety includes a polyol. In some embodiments, a method of preparing an ice-phobic coating includes reacting a vinyl fluoride and a polyol methacrylate under high pressure. In some embodiments, the polyol may include xylitol, glycerol, sorbitol, mannitol, or any other polyol.

In some embodiments, a method of preparing an ice-phobic coating includes reacting a hydrophobic entity with hydrophilic moiety. In some embodiments, a method of preparing an ice-phobic coating includes atom transfer radical polymerization of a polyol methacrylate with a fluoropolymer. In some embodiments, a method of preparing an ice-phobic coating includes reacting a methacrylic acid grafted polymer with a polyol. In some embodiments, a method of preparing an ice-phobic coating includes reacting a polyol methacrylate with a styrene.

In some embodiments, the hydrophobic entity is bonded to the hydrophilic moiety through a covalent bond. In some embodiments, the coating has a melting point of less than about 200° C., less than about 150° C., less than about 100° C., less than about 50° C., or a range between any two of these values (including endpoints). In some embodiments, the coating has a melting point of about 0 to about 200, about 50° C. to about 200° C., about 100° C. to about 200° C., about 150° C. to about 200° C., or a range between any two of these values (including endpoints).

In some embodiments, the hydrophilic moiety is capable of interacting with water to create an interface including unfrozen water molecules, in which a number of unfrozen water molecules in relation to an area of contact can be determined by $$\frac{n}{A} \cong \frac{\lambda}{2v_w} \ln \frac{L_{iw}\Delta T}{P_0 v_w T_c},$$

in which n is the number of unfrozen water molecules at the interface, A is the area of contact, and $v_w$ is a molar specific volume of water, $T_c$ is an equilibrium freezing temperature, $L_{iw}$ is a latent heat, and $\lambda$, describes the membrane geometry.

In some embodiments, the hydrophilic moiety is capable of interacting with water to create an interface, in which water at the interface is in a liquid state. In some embodiments, the hydrophilic moiety is capable of interacting with water to create an interface, in which a freezing point depression ($\Delta T_f$) of the interface is less than about 0 K. In some embodiments, the freezing point depression of the interface is less than about −5 K, less than about −10 K, less than about −15 K, less than about −20 K, or a range between any two of these values (including endpoints). In some embodiments, the hydrophilic moiety is capable of interacting with water to create an interface, in which an activity of water ($a_w$) at the interface is less than about 1. In some embodiments, the hydrophilic moiety is capable of interacting with water to create an interface, in which an activity of water ($a_w$) at the interface is less than about 0.9, less than about 0.8, less than about 0.7, less than about 0.6, less than about 0.5, less than about 0.4, less than about 0.3, less than about 0.2, less than about 0.1, less than about 0.01, or a range between any two of these values (including endpoints). In some embodiments, the activity of water at the interface is from about 0.4 to about 0.8. In some embodiments, the coating includes a polymer. In some embodiments, the coating is water insoluble. In some embodiments, the hydrophilic moiety is capable of covalently bonding with water. In some embodiments, the hydrophilic moiety is present on the substrate at a surface concentration of about $8.9 \times 10^{12}$ to about $8.9 \times 10^{14}$ hydrophilic entities per $cm^2$ of the coated surface.

In some embodiments, the substrate includes cloth, shoes, sporting equipment, rubber, plastic, road signs, traffic lights, sidewalks, aircrafts, vehicles, or snow removal equipment. In some embodiments, the substrate includes a hydrophobic epoxy material. In some embodiments, the substrate includes a bisphenol-A-epichlorohydrin.

In some embodiments, the hydrophobic entity is bonded to the hydrophilic moiety through a covalent bond. In some embodiments, a Gibbs free energy of the hydrophobic entity is negative.

In some embodiments, the coating may be selected from vinyl fluoride-xylitol methacrylate copolymer, glycerol methacrylate-block-vinylidene fluoride-block-glycerol methacrylate, styrene-block-sorbitol methacrylate-block-styrene copolymer, sorbitol methacrylate-block-vinylidene fluoride-block-sorbitol methacrylate, 2-hydroxyethyl myristate, 2-hydroxyethyl myristic ether, vinylidene fluoride-sorbitol methacrylate, or a combination thereof.

Some embodiments are directed to a kit for making an ice-phobic article including an ice phobic coating including a hydrophobic entity bonded to a hydrophilic moiety, in which the hydrophilic moiety is capable of lowering a freezing temperature of water; and instructions for applying the ice-phobic coating onto a substrate.

Some embodiments are directed to an ice-phobic coating that is water insoluble. In some embodiments, the ice-phobic coating includes a wax. The wax of embodiments herein includes a hydrophobic entity attached to a hydrophilic moiety. In some embodiments, the ice-phobic coating is a hydrophilic wax, in which the hydrophilic moieties are in a sufficient density to make the wax hydrophilic. Without wishing to be bound by theory, the ice-phobic coating functions by depressing the freezing point of water where water interfacing with the wax does not freeze. In some embodiments, the hydrophobic entity may include any hydrocarbon or fluorocarbon. The hydrophobic entity may be covalently capped with a hydrophilic moiety. In some embodiments, the ice-phobic coating may be an emulsion or may be used as the neat substance.

Some embodiments are directed to ice-phobic coatings including a hydrophobic entity and a hydrophilic moiety. In some embodiments, the hydrophilic moiety is attached to the hydrophobic entity at one end. In some embodiments, the ice-phobic coating may include a hydrophobic entity having a cross-linked polymer network and bearing grafted or pendent hydrophilic moieties.

For the purposes of this document, the word "coat" includes covering at least a portion of a surface of the article or substrate with the coating described in embodiments herein, and may include instances where the article or substrate is impregnated or otherwise penetrated with the coating of embodiments herein. In some embodiments, the ice-phobic coating may be coated, impregnated, applied, covered, spread, instilled, penetrated, saturated, suffused, or the like onto an article to form a coated article.

In some embodiments, the ice-phobic coating may dissuade the adhesion of ice onto the coated article. In some embodiments, one end of the hydrophobic entity binds to at least one surface of the substrate and the other end of the hydrophobic entity binds the hydrophilic moiety to form the coated article. In some embodiments, the hydrophilic moiety interacts with the water at the interface between the coated article and the ice. It is believed that due to freezing point depression, the ice melts at the interface where the hydrophilic moiety meets the ice forming a liquid layer of water between the coated article and the ice. In some embodiments, the liquid layer of water may increase lubrication between the coated article and the ice.

Other possible anti-freezing or ice-phobic surfaces may include the use of polymer-bound salts. In some embodiments, the ice-phobic coating may include a polymer-bound salt. In some embodiments, the ice-phobic coating may include a hydrophobic entity bound to a salt. In some embodiments, such modified polymer materials may be made into high-strength composites which may be molded into the shapes of winter sports equipment and potentially useful for other applications such as aircraft that are at risk for icing. Thus, in some embodiments, an anti-icing composite may have the potential to not only prevent icing, but also to save weight, leading to a win-win situation for the winter sports enthusiast. In some embodiments, the wear-regenerative anti-icing surface may reduce maintenance costs because the surfaces may rarely, if ever, be in need of replacement or renewing.

The ionic nature of such salts may lower the activity of water and depress the freezing point. However, the ionic nature of such a system might create unfavorable chemical potentials that could lead to corrosion, severely limiting their practicality.

In some embodiments, the hydrophilic moiety may include a salt. In some embodiments, the hydrophilic segment may include an organic salt or inorganic salt. In some embodiments, the hydrophobic and hydrophilic segments may separate into different phases in solution. In some embodiments, the two phases may separate so that the hydrophobic entities exist with other hydrophobic entities and hydrophilic moieties exist with other hydrophilic segments. In some embodiments, the hydrophobic entity has a low surface energy. In some embodiments, the low surface energy of the hydrophobic entity allows it to attach at the substrate surface while the hydrophilic segments face the outside environment of the coated article. In some embodiments, the hydrophobic entity has a surface energy of less than about 30 mN/m, less than about 25 mN/m, less than about 20 mN/m, or a range between any two of these values (including endpoints). In some embodiments, the surface energy of the hydrophobic entity may be between about 0 mN/m to about 30 mN/m, about 0 mN/m to about 25 mN/m, about 0 mN/m to about 20 mN/m, about 5 mN/m to about 30 mN/m, about 5 mN/m to about 25 mN/m, about 5 mN/m to about 20 mN/m, about 7 mN/m to about 20 mN/m, or a range between any two of these values (including endpoints).

Figure 2:
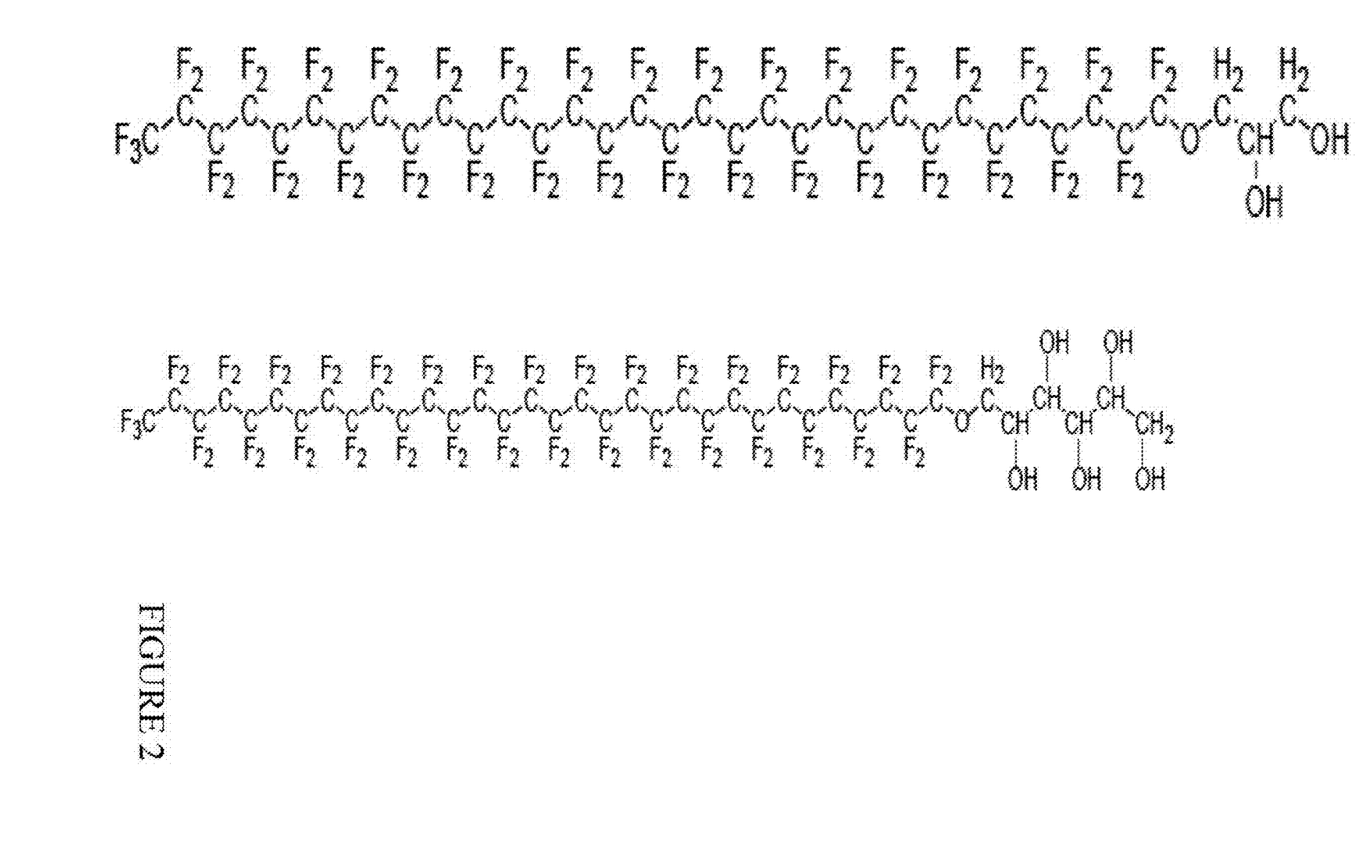
FIG. 2 illustrates exemplary ice-phobic coating compounds including a hydrophobic segment with a hydrophilic cap.

For example, FIG. 2 illustrates two exemplary coatings wherein the hydrophobic entity includes a fluorocarbon attached to a hydrophilic moiety. In the first exemplary compound (top), the hydrophobic entity is a polytetrafluoroethylene and the hydrophilic moiety is a glycerol. In the second exemplary compound of FIG. 2 (bottom), the hydrophobic entity is polytetrafluoroethylene and the hydrophilic moiety is sorbitol.

Figure 3:
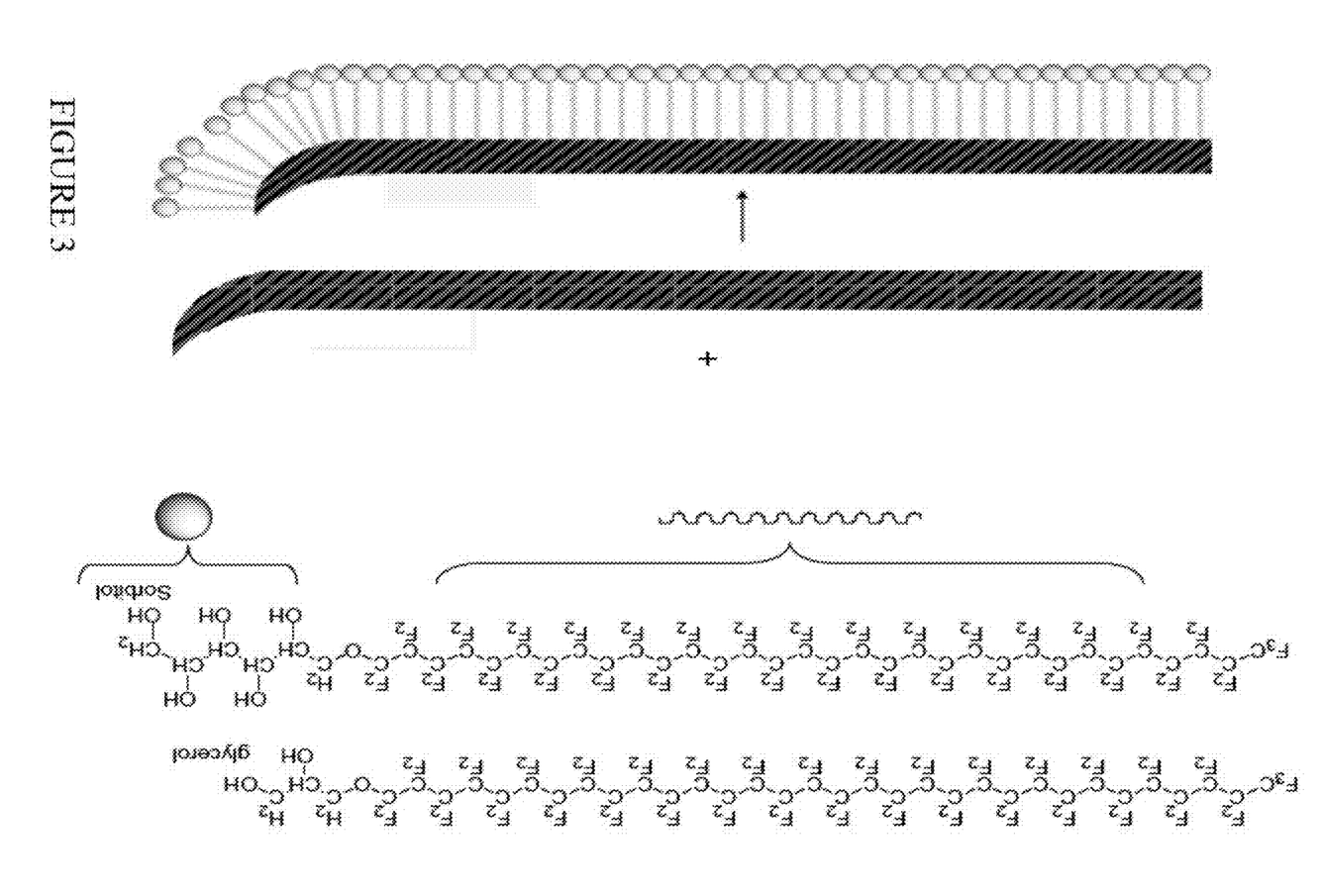
FIG. 3 illustrates exemplary ice-phobic coating compounds including a hydrophobic, low surface energy segment with a hydrophilic, higher surface energy cap coated onto a ski including hydrophobic epoxy material, in which the hydrophobic segment of the coating associates with the ski and the hydrophilic segment faces outward away from the ski surface.

In FIG. 3, a ski coated with an exemplary coating is illustrated. The ski may be coated with the coatings disclosed in FIG. 2, for example. As can be seen from FIG. 3, when an article is coated with the coatings embodied in this document, the hydrophobic entity attaches to the article and the hydrophilic moiety faces outward towards the environment and interacts with the ice.

In some embodiments, the article to be coated may be manufactured using cloth and polymer materials. For example, to manufacture a ski or snowboard, a section of cloth may be impregnated with the ice-phobic coating. The impregnated cloth may then be placed into a mold to shape the item and then baked to cure the ice-phobic coating. In some embodiments, the substrate to be coated may include a bisphenol-A-epichlorohydrin product. In some embodiments, the ice-phobic article may be cured with a polyamide curing agent. The final ice-phobic article may be very robust mechanically, very hydrophobic and difficult to wet. In some embodiments, the Gibbs Free Energy Change of hydroxyls or water coating the surface of the ice-phobic article is positive. A positive Gibbs Free Energy Change indicates that the reaction will be a non-spontaneous process and will not be stable. In some embodiments, the Gibbs Free Energy Change for the low surface energy, hydrophobic moiety coating the epoxy resin is negative. A negative Gibbs Free Energy Change indicates that the reaction will be a spontaneous process and the ice-phobic coating of the ice-phobic article will be stable. In some embodiments, the hydrophobic, low surface-energy entities of the ice-phobic coating may cover at least one surface of the article to be coated while the hydrophilic moieties face outward from the article. For example, in some embodiments, the article may be a ski. In some embodiments, any surface of the article may be coated. For example, in some embodiments, the metal parts of a ski may also be coated with the ice-phobic coatings of embodiments herein. In some embodiments, the surface to be coated may be metal. Metals have a very high surface energy. In some embodiments, covering the metal with a low surface energy material is a spontaneous process due to a negative Gibbs Free Energy change for the process.

Figure 4:
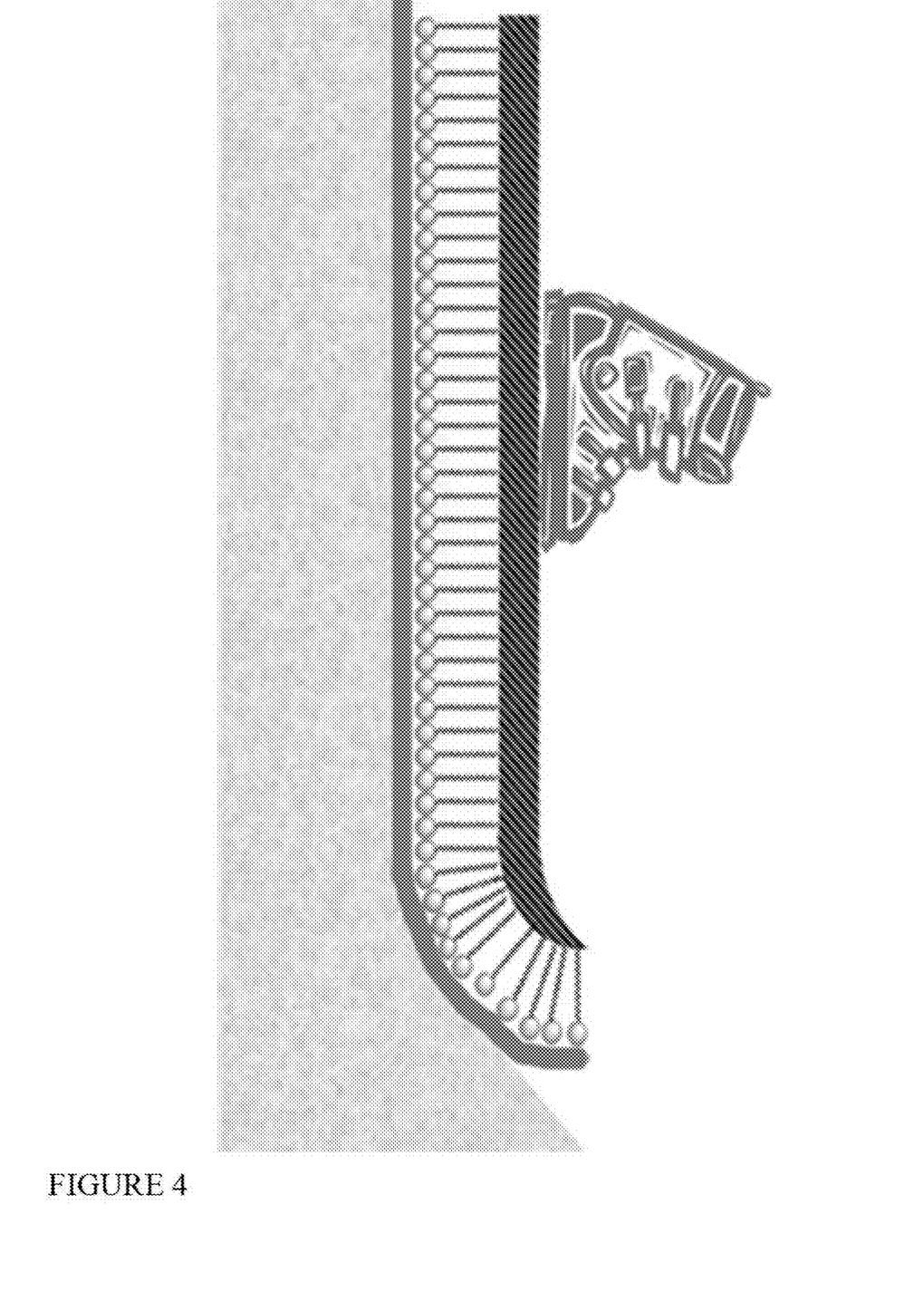
FIG. 4 illustrates an exemplary coated article, an ice-phobic ski, on ice where the hydrophilic segment of the coated ski interacts with the ice causing a thin layer of water between the ski and the ice.

FIG. 4 illustrates an exemplary embodiment of winter sporting equipment on ice coated with the ice-phobic coatings of embodiments described herein. As can be seen in FIG. 4, the low surface energy, hydrophobic entities of the ice-phobic coating cover the surface of the sports equipment while the hydrophilic moieties are on the exterior and interact with the ice. Water has a depressed freezing point at the surface of the coated article due to the activity change in response to the hydrophilic moieties as described mathematically above. In some embodiments, the water interacts with the hydrophilic moieties rather than with itself, preventing freezing. The hydrophilic moiety may interact with water such that the hydrophilic moiety changes the activity of water. In some embodiments, a layer of water forms between the coated article and the ice. The layer of water separates, and lubricates the interface between the coated article and the ice, therefore reducing the friction between the two. One exemplary advantage of the ice-phobic coating of embodiments herein is that it allows the user of the coated sporting equipment to achieve high speeds.

In some embodiments, the coated article may include hydrophobic epoxy resins. In some embodiments, the coated article may be a ski. In some embodiments, the ski may include hydrophobic epoxy resins. In some embodiment, the hydrophobic entity of the ice-phobic coating may associate with the epoxy substrate of the ski. Some embodiments are directed to a ski wax including a hydrophobic entity bonded to a hydrophilic moiety.

EXAMPLES

Example 1: Preparation of Myristic Tosylate

Myristic acid is reduced to myristic alcohol in tetrahydrofuran (THF) using lithium borohydride. The solution is filtered and the solvent removed by rotary evaporation. Any free acid is extracted using 1 N sodium hydroxide.

Myristic alcohol is dissolved into anhydrous chloroform with 1.5 equivalents of triethylamine and cooled on an ice bath. Tosyl chloride (1.02 equivalents) is added drop wise while maintaining temperature. The solution is filtered and the solvent is removed by rotary evaporation. The raw solids are redissolved into chloroform and refiltered and rotovaped to form myristic tosylate.

Example 2: Preparation of an Ice-Phobic Coating Including a Myristate Wax

The myristic tosylate is dissolved into anhydrous THF with 2 equivalents of potassium carbonate and 1 equivalent of crown ether while under dry nitrogen atmosphere. To this solution is added a hydrophilic moiety, such as a polyol, and the solutions are mixed overnight. Overall yield is 75% of the monosubstituted with the remainder disubstituted and unreacted polyol. The resulting myristic ether is isolated as a clear liquid and may be used as an ice-phobic coating.

Example 3: Preparation of an Ice-Phobic Coating Including a Myristate Wax Using Ethylene Glycol The myristic tosylate is dissolved into anhydrous THF with 2 equivalents of potassium carbonate and 1 equivalent of crown ether while under dry nitrogen atmosphere. To this solution is added ethylene glycol, and the solutions are mixed overnight. Overall yield is 75% of the monosubstituted with the remainder disubstituted and unreacted ethylene glycol. 2-hydroxyethyl myristic ether is isolated as a clear liquid and may be used as an ice-phobic coating.

Example 4: Preparation of an Ice-Phobic Coating Including a Myristate Wax Using Glycerol The myristic tosylate is dissolved into anhydrous THF with 2 equivalents of potassium carbonate and 1 equivalent of crown ether while under dry nitrogen atmosphere. To this solution is added glycerol, and the solutions are mixed overnight. Overall yield is 75% of the monosubstituted with the remainder disubstituted and unreacted glycerol. 2-hydroxypropyl myristic ether is isolated as a clear liquid and may be used as an ice-phobic coating.

Example 5: Preparation of an Ice-Phobic Coating Including a Myristate Wax Using Xylitol The myristic tosylate is dissolved into anhydrous THF with 2 equivalents of potassium carbonate and 1 equivalent of crown ether while under dry nitrogen atmosphere. To this solution is added xylitol, and the solutions are mixed overnight. Overall yield is 75% of the monosubstituted with the remainder disubstituted and unreacted xylitol. 2-hydroxypropanyl myristic ether is isolated as a clear liquid and may be used as an ice-phobic coating.

Example 6: Preparation of an Ice-Phobic Coating Including a Myristate Wax Using Sorbitol The myristic tosylate is dissolved into anhydrous THF with 2 equivalents of potassium carbonate and 1 equivalent of crown ether while under dry nitrogen atmosphere. To this solution is added sorbitol, and the solutions are mixed overnight. Overall yield is 75% of the monosubstituted with the remainder disubstituted and unreacted sorbitol. 2-hydroxyhexanyl myristic ether is isolated as a clear liquid and may be used as an ice-phobic coating.

Example 7: Preparation of an Ice-Phobic Coating Including a Myristate Wax Using Combinations of Hydrophilic Moieties Combinations of hydrophilic moieties are prepared by combining two or more hydrophilic moieties. The hydrophilic moieties may be polyols. Examples of combinations includes ethylene glycol, glycerol, xylitol and sorbitol such as ethylene glycol and glycerol, ethylene glycol and xylitol, ethylene glycol and sorbitol, glycerol and xylitol, glycerol and sorbitol, xylitol and sorbitol, ethylene glycol, glycerol and xylitol, ethylene glycol, glycerol and sorbitol, and glycerol xylitol, and sorbitol, among others.

The myristic tosylate prepared according to Example 1 is dissolved into anhydrous THF with 2 equivalents of potassium carbonate and 1 equivalent of crown ether while under dry nitrogen atmosphere. To this solution is added a combinations of hydrophilic moieties and the solutions are mixed overnight. Overall yield is 75% of the monosubstituted with the remainder disubstituted and unreacted hydrophilic moieties. The resulting myristic ether produced by the reaction is isolated as a clear liquid and may be used as an ice-phobic coating.

Example 8: Preparation of Ceroplastic Tosylate

Ceroplastic acid is reduced to ceroplastic alcohol in tetrahydrofuran (THF) using lithium borohydride. The solution is filtered and the solvent removed by rotary evaporation. Any free acid is extracted using 1 N sodium hydroxide.

Ceroplastic alcohol is dissolved into anhydrous chloroform with 1.5 equivalents of triethylamine and cooled on an ice bath. Tosyl chloride (1.02 equivalents) is added drop wise while maintaining temperature. The solution is filtered and the solvent is removed by rotary evaporation. The raw solids are redissolved into chloroform and refiltered and rotovaped to form ceroplastic tosylate.

Example 9: Preparation of an Ice-Phobic Coating Including a Ceroplastic Wax

The ceroplastic tosylate is dissolved into anhydrous THF with 2 equivalents of potassium carbonate and 1 equivalent of crown ether while under dry nitrogen atmosphere. To this solution is added a hydrophilic moiety, such as a polyol, and the solutions are mixed overnight. Overall yield is 75% of the monosubstituted with the remainder disubstituted and unreacted polyol. The resulting ceroplastic ether is isolated as a clear liquid and may be used as an ice-phobic coating.

Example 10: Preparation of an Ice-Phobic Coating Including a Ceroplastic Wax Using Ethylene Glycol The ceroplastic tosylate is dissolved into anhydrous THF with 2 equivalents of potassium carbonate and 1 equivalent of crown ether while under dry nitrogen atmosphere. To this solution is added ethylene glycol, and the solutions are mixed overnight. Overall yield is 75% of the monosubstituted with the remainder disubstituted and unreacted ethylene glycol. 2-hydroxyethyl ceroplastic ether is isolated as a clear liquid and may be used as an ice-phobic coating.

Example 11: Preparation of an Ice-Phobic Coating Including a Ceroplastic Wax Using Glycerol The ceroplastic tosylate is dissolved into anhydrous THF with 2 equivalents of potassium carbonate and 1 equivalent of crown ether while under dry nitrogen atmosphere. To this solution is added glycerol, and the solutions are mixed overnight. Overall yield is 75% of the monosubstituted with the remainder disubstituted and unreacted glycerol. 2-hydroxypropyl ceroplastic ether is isolated as a clear liquid and may be used as an ice-phobic coating.

Example 12: Preparation of an Ice-Phobic Coating Including a Ceroplastic Wax Using Xylitol The ceroplastic tosylate is dissolved into anhydrous THF with 2 equivalents of potassium carbonate and 1 equivalent of crown ether while under dry nitrogen atmosphere. To this solution is added xylitol, and the solutions are mixed overnight. Overall yield is 75% of the monosubstituted with the remainder disubstituted and unreacted xylitol. 2-hydroxypropanyl ceroplastic ether is isolated as a clear liquid and may be used as an ice-phobic coating.

Example 13: Preparation of an Ice-Phobic Coating Including a Ceroplastic Wax Using Sorbitol The ceroplastic tosylate is dissolved into anhydrous THF with 2 equivalents of potassium carbonate and 1 equivalent of crown ether while under dry nitrogen atmosphere. To this solution is added sorbitol, and the solutions are mixed overnight. Overall yield is 75% of the monosubstituted with the remainder disubstituted and unreacted sorbitol. 2-hydroxyhexanyl ceroplastic ether is isolated as a clear liquid and may be used as an ice-phobic coating.

Example 14: Preparation of an Ice-Phobic Coating Including a Ceroplastic Wax Using Combinations of Hydrophilic Moieties Combinations of hydrophilic moieties are prepared by combining two or more hydrophilic moieties. The hydrophilic moieties may be polyols. Examples of combinations includes ethylene glycol, glycerol, xylitol and sorbitol such as ethylene glycol and glycerol, ethylene glycol and xylitol, ethylene glycol and sorbitol, glycerol and xylitol, glycerol and sorbitol, xylitol and sorbitol, ethylene glycol, glycerol and xylitol, ethylene glycol, glycerol and sorbitol, and glycerol xylitol, and sorbitol, among others.

The ceroplastate tosylate prepared according to Example 8 is dissolved into anhydrous THF with 2 equivalents of potassium carbonate and 1 equivalent of crown ether while under dry nitrogen atmosphere. To this solution is added a combinations of hydrophilic moieties and the solutions are mixed overnight. Overall yield is 75% of the monosubstituted with the remainder disubstituted and unreacted hydrophilic moieties. The resulting ceroplastic ether produced by the reaction is isolated as a clear liquid and may be used as an ice-phobic coating.

Example 15: Preparation of an Ice-Phobic Coating Including a Lignoceric Wax

The lignoceric tosylate is dissolved into anhydrous THF with 2 equivalents of potassium carbonate and 1 equivalent of crown ether while under dry nitrogen atmosphere. To this solution is added a hydrophilic moiety, such as a polyol, and the solutions are mixed overnight. Overall yield is 75% of the monosubstituted with the remainder disubstituted and unreacted polyol. The resulting lignoceric ether is isolated as a clear liquid and may be used as an ice-phobic coating.

Example 16: Preparation of an Ice-Phobic Coating Including a Lignoceric Wax Using Ethylene Glycol The lignoceric tosylate is dissolved into anhydrous THF with 2 equivalents of potassium carbonate and 1 equivalent of crown ether while under dry nitrogen atmosphere. To this solution is added ethylene glycol, and the solutions are mixed overnight. Overall yield is 75% of the monosubstituted with the remainder disubstituted and unreacted ethylene glycol. 2-hydroxyethyl lignoceric ether is isolated as a clear liquid and may be used as an ice-phobic coating.

Example 17: Preparation of an Ice-Phobic Coating Including a Lignoceric Wax Using Glycerol The lignoceric tosylate is dissolved into anhydrous THF with 2 equivalents of potassium carbonate and 1 equivalent of crown ether while under dry nitrogen atmosphere. To this solution is added glycerol, and the solutions are mixed overnight. Overall yield is 75% of the monosubstituted with the remainder disubstituted and unreacted glycerol. 2-hydroxypropyl lignoceric ether is isolated as a clear liquid and may be used as an ice-phobic coating.

Example 18: Preparation of an Ice-Phobic Coating Including a Lignoceric Wax Using Xylitol The lignoceric tosylate is dissolved into anhydrous THF with 2 equivalents of potassium carbonate and 1 equivalent of crown ether while under dry nitrogen atmosphere. To this solution is added xylitol, and the solutions are mixed overnight. Overall yield is 75% of the monosubstituted with the remainder disubstituted and unreacted xylitol. 2-hydroxypropanyl lignoceric ether is isolated as a clear liquid and may be used as an ice-phobic coating.

Example 19: Preparation of an Ice-Phobic Coating Including a Lignoceric Wax Using Sorbitol The lignoceric tosylate is dissolved into anhydrous THF with 2 equivalents of potassium carbonate and 1 equivalent of crown ether while under dry nitrogen atmosphere. To this solution is added sorbitol, and the solutions are mixed overnight. Overall yield is 75% of the monosubstituted with the remainder disubstituted and unreacted sorbitol. 2-hydroxyhexanyl lignoceric ether is isolated as a clear liquid and may be used as an ice-phobic coating.

Example 20: Preparation of an Ice-Phobic Coating Including a Lignoceric Wax Using Combinations of Hydrophilic Moieties Combinations of hydrophilic moieties are prepared by combining two or more hydrophilic moieties. The hydrophilic moieties may be polyols. Examples of combinations includes ethylene glycol, glycerol, xylitol and sorbitol such as ethylene glycol and glycerol, ethylene glycol and xylitol, ethylene glycol and sorbitol, glycerol and xylitol, glycerol and sorbitol, xylitol and sorbitol, ethylene glycol, glycerol and xylitol, ethylene glycol, glycerol and sorbitol, and glycerol xylitol, and sorbitol, among others.

The lignoceric tosylate prepared according to Example 8 is dissolved into anhydrous THF with 2 equivalents of potassium carbonate and 1 equivalent of crown ether while under dry nitrogen atmosphere. To this solution is added a combinations of hydrophilic moieties and the solutions are mixed overnight. Overall yield is 75% of the monosubstituted with the remainder disubstituted and unreacted hydrophilic moieties. The resulting lignoceric ether produced by the reaction is isolated as a clear liquid and may be used as an ice-phobic coating.

Example 21: Preparation of an Ice-Phobic Coating Including 2-Hydroxyethyl Myristate A dispersion of myristic acid in ethylene glycol (10-30 wt %) is made and heated to about 130° C. with a small amount of toluene and p-Toluenesulfonic acid (PTSA) as a catalyst under an inert atmosphere. The refluxing toluene is captured in a Dean-Stark apparatus. Water is removed by the refluxing toluene. The system is refluxed for 5 hours or until the required amount of water is removed. The mixture is then added to a separatory funnel. Water and methylene chloride are added. The 2-hydroxyethyl myristate is extracted into the methylene chloride. The methylene chloride is dried over calcium chloride and then removed by rotary evaporation to yield 2-hydroxyethyl myristate as a clear colorless liquid and may be used as an ice-phobic coating. The myristic acid may be replaced with ceroplastic acid or with lignoceric acid, which would result in a waxy solid coating.

Example 22: Preparation of an Ice-Phobic Coating Including 2-Hydroxyethyl Ceroplastic Wax A dispersion of ceroplastic acid in ethylene glycol (10-30 wt %) is made and heated to about 130° C. with a small amount of toluene and p-Toluenesulfonic acid (PTSA) as a catalyst under an inert atmosphere. The refluxing toluene is captured in a Dean-Stark apparatus. Water is removed by the refluxing toluene. The system is refluxed for 5 hours or until the required amount of water is removed. The mixture is then added to a separatory funnel. Water and methylene chloride are added. The 2-hydroxyethyl ceroplastate is extracted into the methylene chloride. The methylene chloride is dried over calcium chloride and then removed by rotary evaporation to yield 2-hydroxyethyl ceroplastate as a clear colorless liquid and may be used as an ice-phobic coating.

Example 23: Preparation of an Ice-Phobic Coating Including 2-Hydroxyethyl Lignoceric Wax A dispersion of lignoceric acid in ethylene glycol (10-30 wt %) is made and heated to about 130° C. with a small amount of toluene and p-Toluenesulfonic acid (PTSA) as a catalyst under an inert atmosphere. The refluxing toluene is captured in a Dean-Stark apparatus. Water is removed by the refluxing toluene. The system is refluxed for 5 hours or until the required amount of water is removed. The mixture is then added to a separatory funnel. Water and methylene chloride are added. The 2-hydroxyethyl lignocerate is extracted into the methylene chloride. The methylene chloride is dried over calcium chloride and then removed by rotary evaporation to yield 2-hydroxyethyl lignocerate as a clear colorless liquid and may be used as an ice-phobic coating.

Example 24: Preparation of an Ice-Phobic Coating Having a Vinyl Fluoride-Sorbitol Methacrylate Copolymer Random copolymers between vinyl fluoride and glycerol methacrylate or sorbitol methacrylate can be made by reacting the two under high pressure.

A stainless steel-lined high pressure reactor is swept with oxygen-free argon and charged with 450 parts of deoxygenated water, 100 parts of sorbitol methacrylate, and 0.1 part of azobisisobutyronitrile (AIBN). The water occupies approximately one-third of the total volume of the reactor. After closing, the reactor is evacuated to a constant pressure to remove the nitrogen, and 107 parts of vinyl fluoride are admitted. The reaction mixture is heated to 80° C., and water is injected to raise the pressure to 300 atmospheres. Re-pressuring with additional water is done as often as is necessary to maintain the pressure at 250-300 atmospheres for a total of 7 hours. The combined pressure drops amount to 220 atmospheres. After completion of the reaction, the pressure is released, there is obtained 200 parts of a tough, clear, spongy material that is roughly 55% vinyl fluoride and 45% sorbitol methacrylate. Glycerol methacrylate, xylitol methacrylate, or any polyol methacrylate may replace the sorbitol methacrylate.

Example 25: Preparation of an Ice-Phobic Coating Having a Fluorinated Graft Polymer with Glycerol Fluorinated graft polymers can be made from commercially available poly(vinylidene fluoride-co-chlorotrifluoroethylene) or poly(vinyl fluoride-co-chlorotrifluoroethylene) using atom transfer radical polymerization.

2.0 g of P(VDFco-CTFE) (containing 1.6 mmol of Cl) is dissolved in 30 mL of N-methylpyrrolidinone (NMP) in a 50 mL Schlenk flask, and then 6.0 g of glycerol methacrylate is added into the polymer solution. After the addition of CuCl (256 mg, 2.58 mmol) and $CuCl_2$ (70 mg, 0.52 mmol), the polymer solution is degassed through three cycles of freeze-pump-thaw, and then the flask is filled with $N_2$. Separately, 472 mg of 1,1,4,7,7-pentamethyldiethylenetriamine is dissolved in 10 mL of N-methylpyrrolidinone in a 50 mL Schlenk flask, and the solution is degassed, followed by filling the flask with N2. The 1,1,4,7,7-pentamethyldiethylenetriamine solution is then transferred into the reaction flask using a N2-purged syringe. The reaction flask is then immersed in an oil bath at 90° C. After 45 min, the reaction mixture becomes very viscous. So the polymerization is stopped by cooling to room temperature and exposure to air. Monomer is removed by a glacial acetic acid/acetone mixture. The resulting graft copolymer is dried in a vacuum oven at 60° C. overnight. The glycerol methacrylate may be replaced with sorbitol methacrylate, xylitol methacrylate or any polyol methacrylate in this method.

Example 26: Preparation of Ice-Phobic Coating Having a Sorbitol Methacrylate-Block-Vinylidene Fluoride-Block-Sorbitol Methacrylate The t-butyl methacrylate is hydrolyzed by dissolving about 0.4 g in 25 mL of N-Methyl-2-pyrrolidone (NMP), and then adding 1.6 mL of concentrated HCl solution (36.9%). After stirring at 100° C. for 48 hours, the solvent is removed by vacuum distillation. The residual solution is poured into a mixture of methanol and water (% v/v) (2/1) to precipitate the resulting methacrylic acid grafted polymer. The methacrylic acid grafted polymer is reacted with sorbitol to form the ester. *Macromolecules* 2006, 39, 3531-3539, herein incorporated by reference in its entirety. AB, ABA block polymers of tert-butyl methacrylate and vinylidene fluoride may be made following procedures discussed in *Polymer Bulletin* 44, 1-8 (2000), herein incorporated by reference in its entirety.

The t-butyl methacrylate is subsequently hydrolyzed by dissolving about 0.4 g in 25 mL of NMP, and then adding 1.6 mL of concentrated HCl solution (36.9%). After stirring at 100° C. for 48 hours, the solvent is removed by vacuum distillation. The residual solution is poured into a mixture of methanol and water (% v/v) (2/1) to precipitate the resulting methacrylic acid grafted polymer. The polymer is then dissolved into a mixture of NMP and 5 fold excess of sorbitol and heated to ~100° C. for 6 hours to react the methacrylic acid grafted polymer is reacted with sorbitol to form the ester. The result is a sorbitol methacrylate-block-vinylidene fluoride-block-sorbitol methacrylate. Sorbitol may be replaced with any other polyol described herein, such as xylitol, glycerol, mannitol, or the like.

Example 27: Preparation of an Ice-Phobic Coating Having a Styrene-Block-Sorbitol Methacrylate-Block-Styrene Copolymer Styrene and t-butyl methacrylate are freshly distilled over a mixture of anhydrous calcium chloride and activated molecular sieves. THF is distilled over sodium into a flame dried reaction flask equipped with argon inlet. The solvent is cooled to −70° C. using a dry ice bath. Styrene (15 g) is cannulated by flame dried pre-purged double needle into the reaction flask, after equilibrium is reached, butyl lithium (0.5 g) is added to the flask. An abrupt color change occurs followed by vigorous activity of the dry ice bath. After 30 minutes, the tert-butyl methacrylate (12 g) is added and 30 minutes after that more styrene (11 g) is added, all by canulation. The reaction is quenched using carbon dioxide pellets. The t-butyl methacrylate is subsequently hydrolyzed by dissolving ~1 g in 50 mL of NMP, and then adding 4 mL of concentrated HCl solution (36.9%). After stirring at 100° C. for 48 h, the solvent is removed by vacuum distillation. The residual solution is poured into a mixture of methanol and water (v/v) 2/1) to precipitate the resulting methacrylic acid grafted polymer. The polymer is then dissolved into a mixture of NMP and 5 fold excess of sorbitol and heated to ~100° C. for 6 hours to react the methacrylic acid grafted polymer with sorbitol to form the ester. The result is a styrene-block-sorbitol methacrylate-block-styrene copolymer. Sorbitol may be replaced with any other polyol, such as glycerol, xylitol, mannitol or the like.

Example 28: Preparation of Ice-Phobic Ski Coated with an Ice-Phobic Coating Having a Vinyl Fluoride-Xylitol Methacrylate Copolymer A ski made of bisphenol-A-epichlorohydrin is coated with an ice-phobic coating having a vinyl fluoride-xylitol methacrylate copolymer. The ice-phobic coating is coated on the bottom of the ski such that the hydrophobic hexadecane head associates with the ski surface and the hydrophilic xylitol tail faces outward towards the ice. Because of the negative Gibbs Free Energy Change of the process of coating, the association between the hydrophobic entity of the ice-phobic coating and the ski surface is spontaneous.

When the ski is used while skiing, a thin layer of water forms between the ice and the ski, thereby lubricating the interface between the ice and ski and reducing friction. This allows the user to go faster on the ice.

In contrast, ice quickly forms on an uncoated ski used as a control. With no water to lubricate the interface between the ice and the uncoated ski, the ice formation on the uncoated ski causes friction with the ice on the slope and causes the user to slow down on the ice as more ice forms on the ski. Furthermore, ice formation on the ski causes damage to the ski and the ski requires more maintenance and more frequent replacement in comparison with the coated ski.

Example 29: A Kit for Making an Ice-Phobic Traffic Sign Including an Ice-Phobic Coating A kit is prepared for making an ice-phobic traffic sign. The kit has an ice-phobic coating having a glycerol methacrylate-block-vinylidene fluoride-block-glycerol methacrylate and instructions for coating the traffic sign with the ice-phobic coating.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this document, will be apparent to those skilled in the art from the foregoing descriptions. Such modifications and variations are intended to fall within the scope of the appended claims. The present disclosure includes the full scope of equivalents to which the claims are entitled. It is to be understood that this disclosure is not limited to particular methods, reagents, compounds, compositions or biological systems, which can, of course, vary. It is also to be understood that the terminology used in this document is for the purpose of describing particular embodiments only, and is not intended to be limiting.

With respect to the use of substantially any plural and/or singular terms in this document, those having skill in the art can translate from the plural to the singular and/or from the singular to the plural as is appropriate to the context and/or application. The various singular/plural permutations may be expressly set forth in this document for sake of clarity.

It will be understood by those within the art that, in general, terms used in this document, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed in this document also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this document can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 bonds refers to groups having 1, 2, or 3 bonds. Similarly, a group having 1-5 bonds refers to groups having 1, 2, 3, 4, or 5 bonds, and so forth.

From the foregoing, it will be appreciated that various embodiments of the present disclosure have been described in this document for purposes of illustration, and that various modifications may be made without departing from the scope and spirit of the present disclosure. Accordingly, the various embodiments disclosed in this document are not intended to be limiting, with the true scope and spirit being indicated by the following claims.

What is claimed is:

1. An ice-phobic coating comprising:
a hydrophobic entity covalently bonded to a hydrophilic moiety, wherein the hydrophilic moiety is capable of lowering a freezing point of water, and wherein the hydrophobic entity comprises a fluorocarbon and the hydrophilic moiety comprises a polyol, wherein the coating is selected from vinyl fluoride-xylitol methacrylate copolymer, glycerol methacrylate-block-vinylidene fluoride-block-glycerol methacrylate, sorbitol methacrylate-block-vinylidene fluoride-block-sorbitol methacrylate, vinylidene fluoride-sorbitol methacrylate, or a combination thereof.

2. The coating of claim 1, wherein the hydrophobic entity comprises about 20 to about 50 carbon atoms.

3. An ice-phobic coating, comprising:
a hydrophobic entity covalently bonded to a hydrophilic moiety, wherein the hydrophilic moiety is capable of lowering a freezing point of water, and wherein the hydrophobic entity comprises a fluorocarbon and the hydrophilic moiety comprises a polyol, wherein the hydrophobic entity comprises a crosslinked polymer network.

4. The coating of claim 1, wherein the coating has a melting point less than about 200° C.

5. The coating of claim 1, wherein the coating is water insoluble.

6. The coating of claim 1, wherein the hydrophilic moiety is capable of covalently bonding with water.

7. An ice-phobic article comprising:
a substrate having the ice-phobic coating of claim 1, on at least one surface to form a coated surface, wherein the coating comprises the hydrophobic entity covalently bonded to the hydrophilic moiety; and
wherein the hydrophilic moiety is capable of lowering the freezing point of water, and
wherein
the hydrophobic entity comprises a hydrocarbon, a fluorocarbon, a fatty acid, a silane, a siloxane, a silicone, or a combination thereof.

8. The article of claim 7, wherein the hydrophobic entity comprises about 20 to about 50 carbons.

9. The article of claim 7, wherein the hydrophobic entity comprises a crosslinked polymer network.

10. The article of claim 7, wherein the coating has a melting point less than about 200° C.

11. The article of claim 7, wherein the hydrophilic moiety is present on the substrate at a surface concentration of about $8.9 \times 10^{12}$ to $8.9 \times 10^{14}$ hydrophilic entities per cm$^2$ of the coated surface.

12. The article of claim 7, wherein the substrate comprises cloth, shoes, sporting equipment, rubber, plastic, road signs, traffic lights, sidewalks, aircrafts, vehicles, or snow removal equipment.

13. A method of making an ice-phobic coating of claim 1, the method comprising: covalently bonding the hydrophobic entity with the hydrophilic moiety, wherein the hydrophilic moiety is capable of lowering the freezing point of water, and wherein the hydrophobic entity comprises the fluorocarbon and the hydrophilic moiety comprises the polyol.

14. The method of claim 13, wherein covalently bonding the hydrophobic entity with the hydrophilic moiety comprises bonding the hydrophobic entity comprising about 20 to about 50 carbons with the hydrophilic moiety.

15. The method of claim 13, wherein covalently bonding the hydrophobic entity with the hydrophilic moiety comprises bonding the hydrophobic entity comprising a crosslinked polymer network with the hydrophilic moiety.

16. The method of claim 13, wherein covalently bonding the hydrophobic entity with the hydrophilic moiety comprises bonding the hydrophilic moiety comprising the polyol with the hydrophobic entity.

17. The method of claim 13, wherein covalently bonding the hydrophobic entity with the hydrophilic moiety comprises bonding the hydrophilic moiety comprising glycerol, sorbitol, mannitol, propylene glycol, sucrose, xylitol, pentaerythritol, erythritol, butanediol, diethylene glycol, dipropylene glycol, ethylene glycol, poly-vinyl alcohol, or a combination thereof with the hydrophilic entity.

18. The method of claim 13, wherein the coating has a melting point less than about 200° C.

19. The coating of claim 3, wherein the hydrophobic entity comprises about 20 to about 50 carbon atoms.

20. The coating of claim 3, wherein the hydrophilic moiety comprises glycerol, sorbitol, mannitol, propylene glycol, sucrose, xylitol, pentaerythritol, erythritol, butanediol, diethylene glycol, dipropylene glycol, ethylene glycol, poly-vinyl alcohol, or a combination thereof.

21. The coating of claim 3, wherein the coating has a melting point less than about 200° C.

22. The coating of claim 3, wherein the coating is water insoluble.

23. The coating of claim 3, wherein the hydrophilic moiety is capable of covalently bonding with water.

24. The coating of claim 3, wherein the coating is selected from vinyl fluoride-xylitol methacrylate copolymer, glycerol methacrylate-block-vinylidene fluoride-block-glycerol methacrylate, sorbitol methacrylate-block-vinylidene fluoride-block-sorbitol methacrylate, vinylidene fluoride-sorbitol methacrylate, or a combination thereof.

* * * * *

UNITED STATES PATENT AND TRADEMARK OFFICE
CERTIFICATE OF CORRECTION

PATENT NO. : 9,856,408 B2  Page 1 of 1
APPLICATION NO. : 14/763739
DATED : January 2, 2018
INVENTOR(S) : Carlson et al.

It is certified that error appears in the above-identified patent and that said Letters Patent is hereby corrected as shown below:

In the Specification

In Column 2, Line 57, delete "$a_w \equiv P / P_0$" and insert -- $\alpha_w \equiv P / P_0$ --, therefor.

In Column 2, Line 61, delete "$a_w$" and insert -- $\alpha_w$ --, therefor.

In Column 2, Line 65, delete "$\ln a = \int_{T_{fus}^*}^{T_{fus}} \frac{\Delta_{fus} H}{RT^2} dT,$" and insert -- $\ln \alpha = \int_{T_{fus}^*}^{T_{fus}} \frac{\Delta_{fus} H}{RT^2} dT,$ --, therefor.

In Column 3, Line 1, delete "where a" and insert -- where $\alpha$ --, therefor.

In Column 6, Line 59, delete "water ($a_w$)" and insert -- water ($\alpha_w$) --, therefor.

In Column 6, Line 62, delete "water ($a_w$)" and insert -- water ($\alpha_w$) --, therefor.

Signed and Sealed this
Twelfth Day of June, 2018

Andrei Iancu
*Director of the United States Patent and Trademark Office*